United States Patent
Bordyn et al.

(10) Patent No.: US 8,509,949 B2
(45) Date of Patent: Aug. 13, 2013

(54) EXTERNAL SYSTEM FOR ROBOTIC ACCURACY ENHANCEMENT

(75) Inventors: Brett Alan Bordyn, Plymouth, MI (US); Myles Daniel Markey, Ann Arbor, MI (US); Michael John Kleeman, Canton, MI (US)

(73) Assignee: Variation Reduction Solutions, Inc., Plymouth, MI (US)

( * ) Notice: Subject to any disclaimer, the term of this patent is extended or adjusted under 35 U.S.C. 154(b) by 676 days.

(21) Appl. No.: 12/408,958

(22) Filed: Mar. 23, 2009

(65) Prior Publication Data
US 2009/0240372 A1    Sep. 24, 2009

Related U.S. Application Data

(60) Provisional application No. 61/070,614, filed on Mar. 21, 2008.

(51) Int. Cl.
*G05B 19/04* (2006.01)
*G05B 19/18* (2006.01)
*G05B 15/00* (2006.01)
*G05B 19/00* (2006.01)

(52) U.S. Cl.
USPC ........... 700/254; 700/253; 700/258; 700/259; 901/2; 901/46; 901/47

(58) Field of Classification Search
None
See application file for complete search history.

(56) References Cited

U.S. PATENT DOCUMENTS

| | | | |
|---|---|---|---|
| 3,866,229 A | | 2/1975 | Hammack |
| 4,409,718 A | * | 10/1983 | Pryor .......................... 29/407.04 |
| 4,412,121 A | | 10/1983 | Kremers et al. |
| 4,523,100 A | * | 6/1985 | Payne ........................ 250/559.33 |
| 4,707,129 A | | 11/1987 | Hashimoto et al. |
| 4,714,339 A | | 12/1987 | Lau et al. |
| 4,792,228 A | | 12/1988 | Haffner |
| 4,974,165 A | * | 11/1990 | Locke et al. .................. 700/193 |
| 5,042,709 A | | 8/1991 | Cina et al. |
| 5,100,229 A | | 3/1992 | Lundberg et al. |
| 5,666,202 A | * | 9/1997 | Kyrazis ........................ 356/614 |
| 5,907,229 A | | 5/1999 | Snell |
| 6,321,137 B1 | * | 11/2001 | De Smet ....................... 700/245 |
| 6,400,452 B1 | | 6/2002 | Maynard |
| 6,415,191 B1 | * | 7/2002 | Pryor .............................. 700/95 |
| 6,437,860 B1 | | 8/2002 | Jappinen |
| 6,460,004 B2 | * | 10/2002 | Greer et al. ................... 702/104 |
| 6,519,860 B1 | | 2/2003 | Bieg et al. |
| 6,611,346 B2 | | 8/2003 | Granger |
| 6,667,798 B1 | | 12/2003 | Markendorf et al. |
| 6,681,151 B1 | * | 1/2004 | Weinzimmer et al. ........ 700/259 |
| 6,775,014 B2 | | 8/2004 | Foote et al. |
| 6,882,901 B2 | | 4/2005 | Gong |
| 7,233,837 B2 | * | 6/2007 | Swain et al. .................. 700/186 |
| 7,289,226 B2 | | 10/2007 | Hill |
| 7,298,495 B2 | | 11/2007 | Lewis et al. |
| 7,330,777 B2 | * | 2/2008 | Hashimoto et al. ........... 700/247 |

(Continued)

*Primary Examiner* — Khoi Tran
*Assistant Examiner* — Bao Long T Nguyen
(74) *Attorney, Agent, or Firm* — Inventa Capitol PLC

(57) ABSTRACT

The inventive concept of the metrology system (the system) actively determines the 6 Degree of Freedom (6-DOF) pose of a motion device such as, but not limited to, an industrial robot employing an end of arm tool (EOAT). A concept of the system includes using laser pointing devices without any inherent ranging capability in conjunction with the EOAT-mounted targets to actively determine the pose of the EOAT at distinct work positions of at least one motion device.

12 Claims, 14 Drawing Sheets

(56) References Cited

U.S. PATENT DOCUMENTS

| | | |
|---|---|---|
| 7,352,446 B2 | 4/2008 | Bridges et al. |
| 7,952,728 B2 * | 5/2011 | Ibach et al. ............... 356/614 |
| 2001/0015808 A1 | 8/2001 | Akihiro |
| 2001/0024282 A1 | 9/2001 | Lysen et al. |
| 2003/0043362 A1 | 3/2003 | Lau |
| 2003/0206285 A1 | 11/2003 | Lau |
| 2006/0022314 A1 | 2/2006 | Grigg et al. |
| 2007/0116352 A1 | 5/2007 | Duquette et al. |
| 2007/0211239 A1 | 9/2007 | Mandella et al. |

* cited by examiner

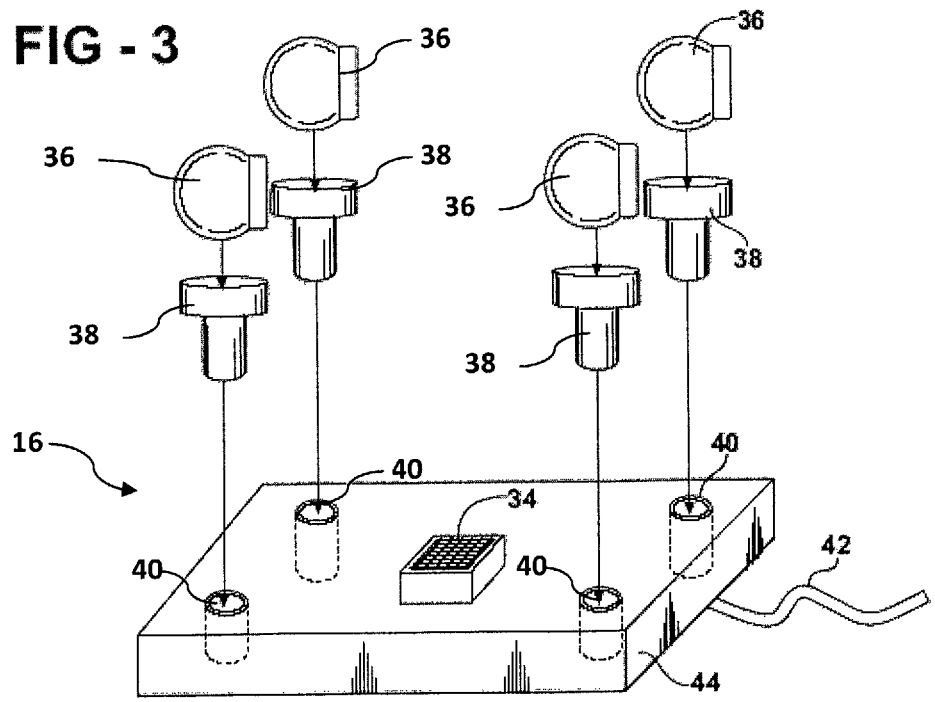
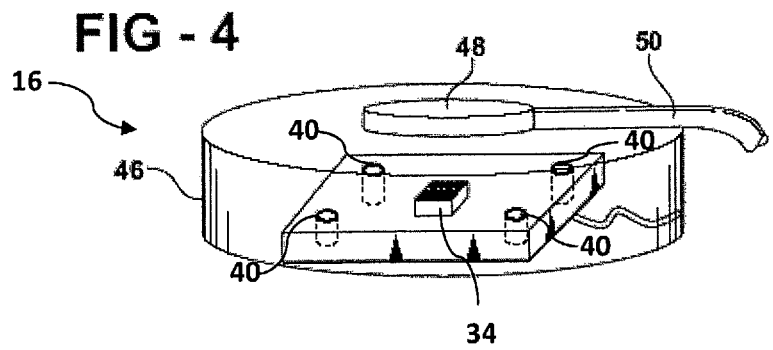

Set up Metrology System (theodolites, photogrammetric system, or laser tracker). Measure at least three benchmark positions on the calibration stand in order to report in calibration stand coordinate system. Insert (at least 3) target-nest combinations into each of the dowel holes of the Active Target plate. Target type will depend on Metrology System used.

↓

Clamp and power up Active Target on calibration stand slide. Install stop device onto calibration stand. Advance Active Target on slide unit until stop device contacts the photosensitive array (cover glass on the chip). Lock position of slide unit and remove stop device. Let the manufactured thickness of the cover glass be $D$. The photosensitive array cover glass is now at the $z = D$ plane of the calibration stand coordinate system (i.e., the photosensitive array is at the $z = 0$ plane of the calibration stand).

↓

Power up the lasers on the calibration stand. From the initial certification of the calibration stand, the $(x,y,0)$ position of each laser beam is already known (this could easily be done via theodolites). Thus, the $(x,y)$ values of each laser spot on the photosensitive array ($z = 0$ plane) are known in calibration stand coordinates.

↓

Process an image from the photosensitive array and solve for the centers of each laser spot in pixel space. By doing a best-fit of at least three points (at least 3 laser spots known in both calibration stand coordinates and pixel coordinates), the *array-to-calibration stand* relationship can be determined.

↓

Using the Metrology System (that is measuring in calibration stand coordinates), measure the targets placed in each dowel hole of the Active Target plate. These $(x,y,z)$ values will be stored in a calibration file along with the *array-to-calibration stand* matrix. One could obviate the need for subsequent use of the Metrology System by both precision machining the Active Target (plate dimensions, dowel placement, array location) and precision mounting the Active Target in the calibration stand, but it is most likely much less expensive to employ a Metrology System when calibrating a batch of Active Targets in a single session.

FIG - 10

```
┌─────────────────────────────────────────────────────────────────────────────┐
│ Set up Metrology System (theodolites, photogrammetric system, or laser     │
│ tracker) that will be used to certify the work cell. Register Metrology    │
│ System in World coordinate frame of work cell.                             │
└─────────────────────────────────────────────────────────────────────────────┘
                                     ↓
┌─────────────────────────────────────────────────────────────────────────────┐
│ Measure the control points on the Part in World coordinates. Each control  │
│ point will have known Part coordinates, such as from a CAD model. Control  │
│ points will usually be dowel holes, but could be any controlled feature on │
│ the Part such as a corner, block, etc. By measuring at least 3 control     │
│ points on the Part (and knowing the CAD values of each control point), the │
│ Part-to-World transform can be determined via a best-fit.                  │
└─────────────────────────────────────────────────────────────────────────────┘
                                     ↓
┌─────────────────────────────────────────────────────────────────────────────┐
│ Distribute and mount the Active Targets to the workpiece (Part), supply    │
│ power, and establish communication. The workpiece Active Targets will be   │
│ designed to mount to the same control points on the part that were         │
│ measured in the previous step. It is important that the mechanical         │
│ mounting is repeatable (Active Target not allowed to rotate or shift with  │
│ respect to control point).                                                 │
└─────────────────────────────────────────────────────────────────────────────┘
                                     ↓
┌─────────────────────────────────────────────────────────────────────────────┐
│ Attach target/nest combinations to the Active Target (in our example, in   │
│ the dowel holes machined in the Active Target plate).                      │
└─────────────────────────────────────────────────────────────────────────────┘
                                     ↓
┌─────────────────────────────────────────────────────────────────────────────┐
│ Measure and record the World (x,y,z) positions of each of the targets      │
│ attached to the Active Target. Note ID of Active Target. These positions   │
│ are automatically known in Part coordinates also.                          │
└─────────────────────────────────────────────────────────────────────────────┘
                                     ↓
┌─────────────────────────────────────────────────────────────────────────────┐
│ The Active Target calibration file is used to determine the pose of the    │
│ photosensitive array in the World and Part coordinate systems. Since we    │
│ also measured the corresponding control point of the Part in World         │
│ coordinates, the relationship between the Active Target and the control    │
│ point can be solved. This transform only needs to be determined once for   │
│ each Active Target during the work cell certification process, and will be │
│ used to determine the as-positioned Part pose in World coordinates.        │
└─────────────────────────────────────────────────────────────────────────────┘
```

FIG - 13

Set up Metrology System (theodolites, photogrammetric system, or laser tracker) that will be used to certify the work cell. Register Metrology System in World coordinate system of work cell.

↓

Select a Beacon that is to be certified in World coordinates. Point the Beacon to a direction in the work cell. Since the Beacon is calibrated in its own coordinate space (Beacon coordinates), the vector of the laser beam along with the (x,y,z) Beacon coordinates of the laser output aperture are known.

↓

Attach target/nest combinations to an Active Target (in our example, in the dowel holes machined in the Active Target plate). This Active Target will need to be moved around the work cell during the Beacon calibration, so it may be mounted to a tripod, clamped to a tool, etc. Place the Active Target such that the laser beam of the Beacon hits the photosensitive array of the Active Target.

↓

Measure and record the World (x,y,z) positions of each of the targets attached to the Active Target.

↓

The computer processes the image of the laser beam spot on the Active Target's photosensitive array. The center of the laser spot is determined in pixel space, and using the Active Target's calibration file, the center of the beam is determined in World coordinates.

↓

Point the Beacon to a second and third point in the cell, preferably at locations that form a mutually orthogonal set of lines with respect to the first of the Beacon. Repeat steps 3 – 5 at each point. At this point, there is enough information to determine the position and orientation of the Beacon relative to World coordinates (intersect of three lines to three Beacon laser aperture coordinates along with three elevation/azimuth angle pairs). The *Beacon-to-World* transform is stored for this Beacon ID on the computer.

↓

For a more accurate *Beacon-to-World* transform, it may be necessary to repeat steps 3 – 5 to collect more than 3 calibration positions within the work cell. Subsequent positions need not be orthogonal to each other, but the best results will arise from having at least 3 mutually orthogonal Active Target positions with respect to the Beacon.

FIG - 14

Motion Device moves to work position and signals that it is ready to be measured.

↓

The Beacons identified with this work position point to the appropriate Active Targets on the EOAT. Active Targets grab images of the laser beam positions. Computer processes images to determine center of each laser beam. Using the *Active Target-to-Tool* transforms, the computer solves for each laser beam center in Tool coordinates.

↓

Each relevant Beacon reports to the computer its current laser beam vector and (x,y,z) laser exit aperture position in Beacon coordinates. Using the *Beacon-to-World* transforms, these values are converted into World coordinates.

↓

Each relevant Active Target on the EOAT now has a Tool value for the laser beam center along with a line defined in World coordinates that this Tool value exists somewhere along. It is possible to solve for the 6-DOF pose of the EOAT when there are at least 3 such sets of data provided, as long as not all of the World lines are parallel to each other. The optimum situation would be 3 mutually orthogonal lines hitting Active Targets with at least one positioned closely to the TCP of the EOAT. While this perfect situation would rarely be achieved, extra accuracy can be gained by using more than 3 lines of sight.

FIG - 15

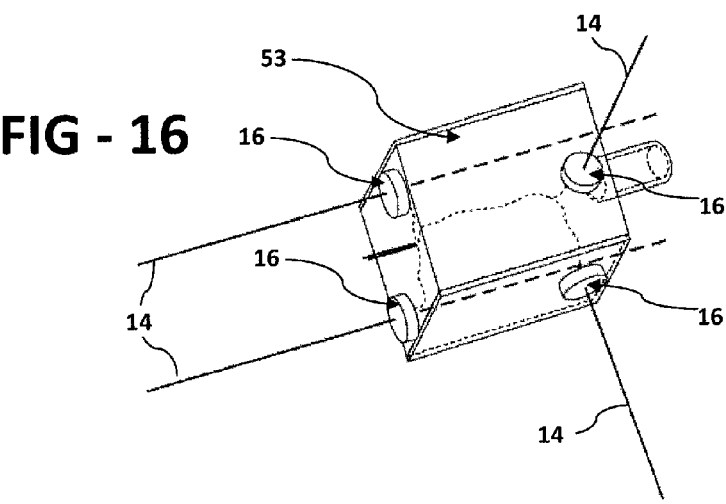

FIG - 16

Request is made to re-acquire the *Beacon-to-World* transform. This might be done periodically to account for temperature drift within the station (Beacon mounted on steel or aluminum structure), when a faulty Beacon is replaced in the work cell, or, for a palletized system that includes the Beacon, to check if the pallet has moved relative to the work cell.

↓

This process is very similar to that of FIG. 14, where the pose of a Beacon is initially defined relative to World coordinates as part of the work cell certification. Here, the Beacon instead points to at least three fixed Active Targets. The Active Targets will need to have been certified in World space as per FIG. 12, and of course it makes sense that they be mounted to low CTE materials (for example, concrete or carbon fiber). Again, the more Active Targets measured, and the closer to orthogonality the angular spread of the Active Targets are to each other with respect to the Beacon, the more accurate the new *Beacon-to-World* transform will be.

↓

Each Beacon that gets an updated *Beacon-to-World* transform will therefore immediately be able to resume operating under the 'current' conditions. Another example that could warrant this updating would be if a Beacon were itself deployed on a positioning unit (for example, in certain situations it may be less expensive to make a crude positioner for a Beacon as opposed to purchasing another Beacon in order to satisfy Line-of-Sight requirements).

FIG - 18

EXTERNAL SYSTEM FOR ROBOTIC ACCURACY ENHANCEMENT

RELATED APPLICATIONS

This is a non-provisional patent application that claims priority to a provisional patent application Ser. No. 61/070,614 filed on Mar. 21, 2008 and incorporated herewith by reference in its entirety.

FIELD OF THE INVENTION

The present invention relates to systems for robotic and equipment accuracy enhancement and methods.

BACKGROUND OF THE INVENTION

In the field of robotics and Numerically Controlled (NC) motion systems, a great amount of effort and research has been dedicated to modeling and characterizing said motion devices and motion systems in pursuit of accuracy enhancement. With industrial robots in particular, manufacturers and after-market companies have focused mainly on modeling the 'as-built' conditions of a robot. Usually, parameters in the kinematic model of the robot are adjusted based on the results of a one-time volumetric calibration of the robot in a variety of poses throughout its work envelope; typically, an external metrology device such as a laser tracker is employed to measure and compare the actual versus commanded pose (or simply position) of the robot over a distribution of locations. A further expansion of the aforementioned volumetric calibration of a robot includes similar methods that can be periodically performed on the manufacturing floor, but are not intended to be carried out during production. Such off-line calibration methods only provide a snap-shot in time of the robot's characteristics, and do not account for the degradation in accuracy due to wear or possible thermal changes that inevitably occur in between system calibrations.

The art is replete with various prior art laser tracking systems methods, which can locate a target in any of three to six degrees of freedom (DOF), thereby aligning robotic devices relative to the target to perform operations on a workpiece. These prior art systems and methods are taught by U.S. Pat. Nos. 4,412,121 to Kremers et al., U.S. Pat. No. 4,707,129 to Hashimoto et al., U.S. Pat. No. 4,714,339 to Lau et al., U.S. Pat. No. 4,792,228 to Haffner, U.S. Pat. No. 5,042,709 to Cina et al., U.S. Pat. No. 5,100,229 to Lundberg et al., U.S. Pat. No. 5,907,229 to Snell, and U.S. Pat. No. 6,400,452 to Maynard. The U.S. Pat. No. 4,714,339 to Lau et al., for example, teaches a three dimensional tracking system is a simplification of the five degree of freedom tracking system.

Still other accuracy enhancement methods involve in-line updating of the robot's kinematic model parameters, usually either via periodically presenting the robot end effector (in various poses) to fixed sensors that typically do not exist within the actual 'work volume' of the robot or via providing 'enhanced' encoder read-outs for the robot joints (or combination thereof). At least one from this class of methods does involve measuring the robot end effector position in the 'work volume' of the robot, but does not accomplish this during the robot's actual work cycle. All the aforementioned methods, whether intended to be 'one-shot' or periodically updated, are ultimately only predictive, and can be considered 'passive' with respect to truly knowing the current pose of the end effector.

Active (real-time) measurement of a robot's end effector via external metrology devices has long been investigated, and many commercial applications are currently being undertaken or have already been implemented. Laser trackers and laser radar units certainly possess the requisite accuracies to sufficiently guide/correct a robot for a variety of manufacturing processes, but are single line of sight (LOS) devices. In the case of laser trackers, they require time to 'search' for their corner cube targets. For laser radar, hemispherical targets are typically scanned. Each type of system is prohibitively expensive and slow for widespread application in real-time active robotic correction. 6-DOF generation using traditional corner cube reflectors requires either multiple laser trackers or, more commonly, measuring multiple corner cube targets on a robot's end of arm tool (EOAT). Many specialized target designs have been described that are meant to determine 5-DOF or 6-DOF of said target by employing a single line of sight from a laser tracker (using interferometric and/or time of flight techniques). Such a device employing a corner cube with an apical opening, smaller than the laser beam diameter, that allows a part of the beam to strike a photosensitive detector behind it, thereby providing 5-DOF (x,y,z,tilt,yaw) of the target is described in the U.S. Pat. No. 6,667,798 to Markendorf et al. United States Publication No. 20060222314 to Zumbrunn, et al., for example, adds patterned photo-emitters to the 5-DOF target; when measured by an external camera incorporated onto the laser tracker, target roll can also be determined. Commercially, the active probe possesses multiple LEDs that are picked up by the camera piggy-backed on the laser tracker. In this case, the laser tracker does not waste time searching for the corner cube since it uses a priori information of the probe's location via the camera's measurement of the LEDs. There are several limitations for solutions of this sort. Since the apex angles between the LEDs are quite small as viewed by the camera, any error in determining the transverse position of the LEDs contributes to angular errors in the 6-DOF solution. Similar angular ambiguity results from the distance between the photosensitive device and the corner cube being so small; any error in calculating the position of the laser spot on the photosensitive surface results in a large angular error of the target itself owing to the need for keeping the target's dimensions small enough to fit on a robot end effector. Additionally, this grey-scale option is quite expensive, and the probe is too large and directionally-limited to be mounted on many robotic end effectors, especially where the process requires that the robot exercises a full range of poses. United States Publication No. 20030043362 to Lau et al. describes an active target probe used in conjunction with a laser tracker that provides 6-DOF of the target, wherein polarized light is used to deduce roll of the target. This target also has the advantage of rotating to keep its aperture perpendicular to the incident laser tracker beam. Still, this target has angular limitations for yaw, pitch, and roll detection; lacks the requisite accuracy for higher-precision robot correction applications; is still too large to incorporate into many end-effector designs; and is expensive. The probes described here are generally too large to be positioned close to the tool center point (TCP) of the robot, resulting in 'lever-arm' effects when ascertaining the pose of the TCP. And, coupled with the fact that they require a laser tracker or camera-enhanced laser tracker to perform, such systems are prohibitively expensive, especially when compared to the base price of a standard articulated arm robot.

Indoor optical GPS has recently made inroads to many manufacturing solutions and can provide the current pose of a robot, but such systems cannot at this time demonstrate accuracies near those that are needed for high precision robot guidance applications. The systems do have receivers with large fields of view over which to pick up the laser output of the transmitters, but are still LOS devices. In the context of high precision robot guidance, the cost-effectiveness of indoor GPS can only be realized when large numbers of receivers are required on the manufacturing floor.

Photogrammetry has been employed for active robotic correction to varying degrees of success. Most use end effector-mounted 'active' targets, such as LEDs, and do not depend on more traditional techniques using external lighting of reflective stickers. These photogrammetric solutions generally fall into two categories. The first involves 'single sensor housing' solutions, where multiple photosensitive devices are distributed within a single housing (typically there are three distinct LOS emanating from the housing). The second involves using multiple, statically-positioned cameras whose fields of view provide overlap within the volume of interest. Photogrammetric solutions have the great advantage of very high refresh rates (for example, three targets can typically be measured in less than a millisecond, thus providing 6-DOF of an object). This speed allows for dynamic tracking of multiple coordinate frames, and can even tolerate most production environment vibrations. Considering these features, one would logically conclude that this class of solutions holds the most promise for high precision active robotic correction. There are a few subtleties that bear explanation, however. First off, the volume of interest of 'single sensor housing' photogrammetric solutions is limited to a wedge that typically extends only to 6 meters from the device (the closer you get to the sensor, the smaller the transverse field of view becomes). Since the allowable spacing between the LED targets that need to be placed on a typical robot end effector is usually small, poor apex angles generally result between the LEDs as viewed by the system. In an effort to put all the photosensitive devices and optics in a single sensor housing, the apex angles between each line of sight are likewise compromised. Thus, while these types of sensors are typically quite accurate in the transverse directions, distance determination is the weakest component of the 6-DOF transform. The poor apex angles could be corrected by adding another photogrammetric head in the work cell at nearly 90 degrees to the first photogrammetric head, but the resulting overlap between the two wedge volumes becomes prohibitively small for most applications. Taking into consideration that a single head photogrammetric system typically costs as much as a laser tracker, the cost per measurement volume becomes a huge factor. The second approach to active target photogrammetry generally uses multiple sensors with overlapping fields of view, achieving significantly better apex angles among the cameras. During operation, the sensors are statically positioned, and the cameras must be aggressively internally calibrated over their entire volumes of interest. Again, though, the volume of overlap between the cameras is limited. And, while the sensors for these types of photogrammetric systems are cheaper than the 'single sensor housing' varieties, they are still considerable when compared to the cost of a robot, so adding additional LOS capability by adding more sensors is seldom a viable option.

Still another class of devices that could be used for determining the pose of a robot EOAT includes theodolites and total stations. There are now total station models that are automated, allowing the electronic theodolite to be aimed/driven remotely via a computer. These devices also include time of flight ranging devices that employ reflective targets (allowing for line of sight measurements up to a few kilometers) or no targets at all (lighter-colored surfaces can be measured at a few hundred meters' distance). Ranging accuracy is typically on the order of 2-3 mm. Pointing accuracy (azimuth, elevation) range from 5-8 arcseconds for construction grade systems all the way up to 0.5 arcseconds in precision systems. As a stand-alone gimbal, such systems cannot provide accuracies greater than those already achieved by robots with enhanced accuracy modeling. Even if the ranging capability was not used in favor of locating the angular positions of 3+ reflectors on a robot EOAT and solving 6-DOF via traditional photogrammetric techniques, one again arrives at a poor apex-angle solution. Multiple gimbals would allow for photogrammetric determination of an EOAT's 6-DOF pose by allowing for more optimum apex angles, and the novel invention described herein seeks to do so by employing an even less-expensive alternative by obviating any range-detection hardware.

The inherent limitations of 'passive' robot correction, along with the performance shortcomings and cost barriers of existing 'active' robot correction systems, were all taken in to consideration when developing the following affordable, external active robot correction system. Additional techniques include multiple length measurement with laser, acoustics, or wires; and multiple camera-like systems. Stereo-triangulation is undesirable since it requires a minimum of two tracking systems and it is a static measuring technique. Similarly, imaging by camera is undesirable since the resolution of the system is typically much too low to adequately cover the working envelope of a robot, in addition to the unrealistic stabilities and accuracies required when generating/maintaining the internal calibrations of such optical systems.

Therefore, there is a long-standing need for an improved system and method of external robotic accuracy enhancement.

SUMMARY OF THE INVENTION

A system for robotic accuracy enhancement (the system) includes a plurality of robotic devices adaptable for multi-axial movement. Each robotic device includes an arm having an end of arm tool (EOAT) presenting at least one axis for performing at least one operation on a workpiece. A plurality of multi-axial devices projects laser beams oriented relative to said robotic device. A plurality of removable target elements is connected to the EOAT of each robotic device. Each target element is pre-certified in the EOAT coordinate frame, allowing the robotic devices to orient the EOAT relative to the workpiece before performing an operation on the workpiece as each of the target elements are illuminated by the multi-axial devices. Each target element comprises a base, such as a plate, formed from at least one of metallic and non-metallic materials and presents a plurality of openings defined therein. The base presents a plurality of removable nest elements attachable to the respective openings defined in the plate and a plurality of calibration targets magnetically supported by the respective nest elements. The base further includes a photosensitive array defined in the plate. A housing encapsulates each of the target elements, said housing having a shutter device. A controller is operably communicated with the target elements, the plurality of multi-axial devices, and the plurality of robotic devices for manipulating at least one multi-axial device to activate at least one target element.

The system actively determines the 6-DOF pose of the robotic device. An inventive concept of the system includes using multi-axial devices for projecting lasers (laser pointing devices, also referred to here as beacons), onto EOAT-mounted targets (the active targets) to actively determine the pose of the EOAT at distinct work positions of at least one motion device without the use of any range detection hardware. The beacons are small, inexpensive, and inherently modular, and thus can be distributed throughout a work cell to guarantee multiple LOS. The beacon quantities and positions as set forth in the present application are not intended to limit the scope of the present invention and are optimized to the CAD design of the work cell and simulated paths of at least one motion device. The beacons may operate on more than one motion device, thus reducing the per motion device cost of the system in work cells utilizing multiple motion devices. Multiple LOS ensure good apex angles for more accurate determination of the EOAT pose, unlike many photogrammetric metrology devices. The active targets contain at least one inexpensive, photosensitive device such as, but not limited to, CMOS or CCD arrays and/or line arrays. Being that these devices have an active surface area, there usually will not be the need to 'search' for the active targets, unlike a laser tracker. Once the initial certification of the proposed system within the work cell is complete, faulty beacons or active targets can be swapped out without loss of certification information.

One of the advantages of the present invention is to provide the system that obviates the need to purchase expensive modeling/correction packages that are commonly sold with industrial robots.

Another advantage of the present invention is to provide the system at a low price, which is significantly cheaper on a per robot basis than prior art systems.

Still another advantage of the present invention is to provide the system that serves as a process monitoring tool, since the EOAT pose of the motion device is actually measured at each work position, instead of simply being estimated/predicted as per many existing 'passive' robot accuracy enhancement packages. Such a system can be used to archive pose data during a process for later analysis.

Still another advantage of the present invention is to provide the system that significantly reduces or eliminates the need to perform in-situ calibrations or characterizations of motion platforms in an effort to 'model' or 'characterize' the motion device. Since this is an active measurement system, the proposed system may result in cheaper motion platforms being able to achieve tighter pose tolerances. An example would be the ability to replace expensive NC machines with cheaper industrial robots.

Since the proposed system has the capability to monitor the pose of the EOAT in real time, an avenue for tracking/correcting the pose of the EOAT while it performs its work (such as drilling) is made possible. Since the actual pose of the EOAT is measured, backlash can be overcome when the motion device's pose is corrected since the motion device may not be allowed to commence work until an 'acceptable' pose is achieved.

Still another advantage of the present invention is to provide the system that takes a 'black-box' approach to robot accuracy enhancement, in effect measuring the aggregate result of all the contributing factors to robot pose error without regard to implicitly measuring or modeling any individual contributor. For example, temperature effects, both ambient and internal to the motion device (such as servo temperature), are automatically accounted for via the system. Deflection is also accounted for via the system (think of the extra modeling necessary when a robot is mounted to additional slide units). Even non-geometric effects that are not usually included in a robot's kinematic modeling such as joint flexibility, link flexibility, and gear transmission error are actively accounted for in such a system. Robot or end effector wear can also be tracked over thousands of duty cycles utilizing such a system.

Still another advantage of the present invention is the ability to link together or update various coordinate frames by placing the active targets on the workpiece, fixed about the work cell, on a movable device such as a tripod, or on palletized systems. This ability allows for a multitude of capabilities, such as generating part-to-world transforms, compensating for temperature drift within a work cell, initially calibrating beacon-to-world poses, subsequently recalibrating beacon-to-world poses, or establishing the relationship between a fixed work cell and a palletized robotic system that moves to it, or even monitoring of automated guided vehicle (AGV) systems.

BRIEF DESCRIPTION OF THE DRAWINGS

FIG. 3 illustrates a perspective and exploded view of an active target device of the present invention;

FIG. 4 illustrates the active target of FIG. 4 enclosed by a housing;

FIG. 10 is a schematic view of a calibration process;

FIGS. 13 through 15 and FIGS. 17 through 19 present various schematic views of methods of external robotic accuracy enhancement of the present invention; and FIG. 16 illustrates another perspective view of an end of arm tool of a robotic device having a plurality of active targets connected thereto and activated by laser beams;

Other advantages of the present invention will be readily appreciated as the same becomes better understood by reference to the following detailed description when considered in connection with the accompanying drawings as shown further below.

DETAILED DESCRIPTION OF THE PREFERRED EMBODIMENT

Figure 1:
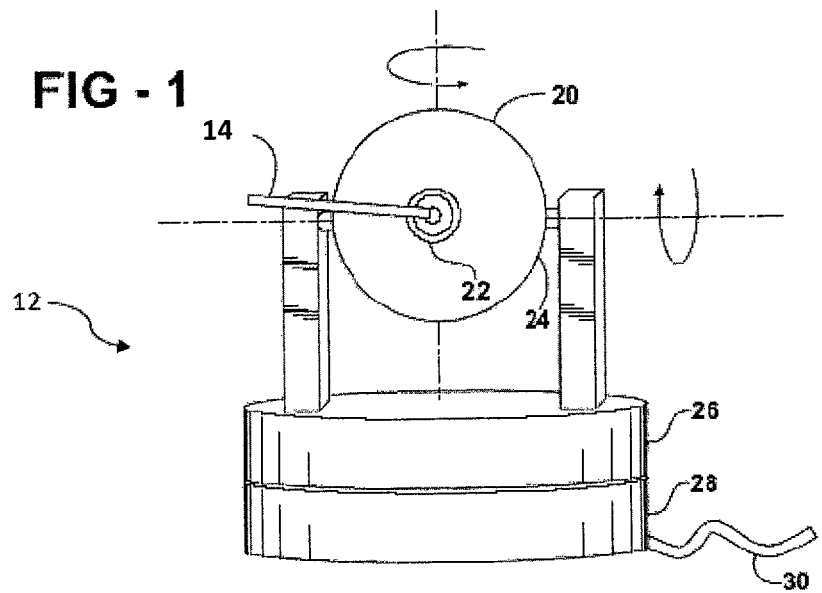
FIG. 1 illustrates a front view of a multi-axial device for steering a light beam.
Figure 2:
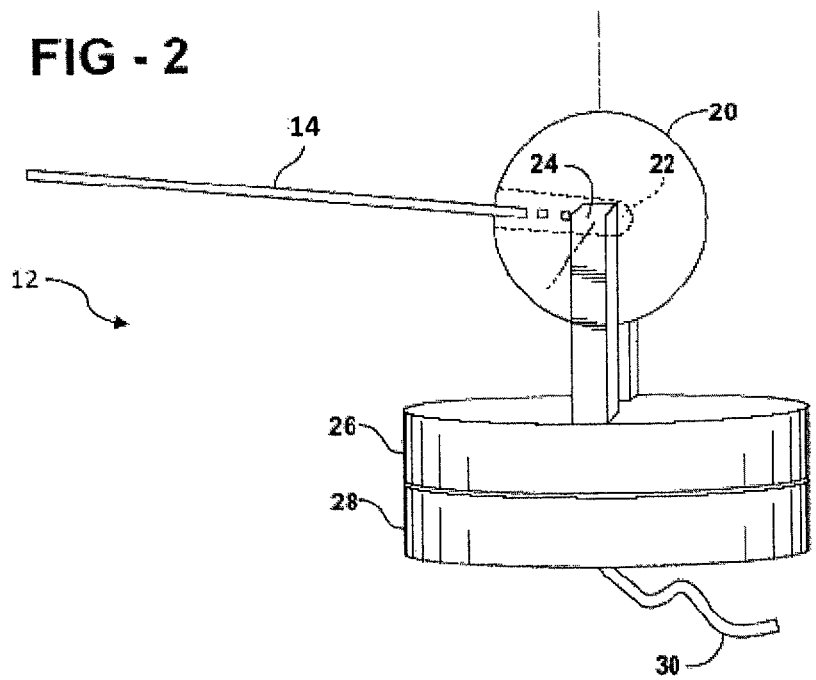
FIG. 2 illustrates a side view of the multi-axial device of FIG. 1.
Figure 6:
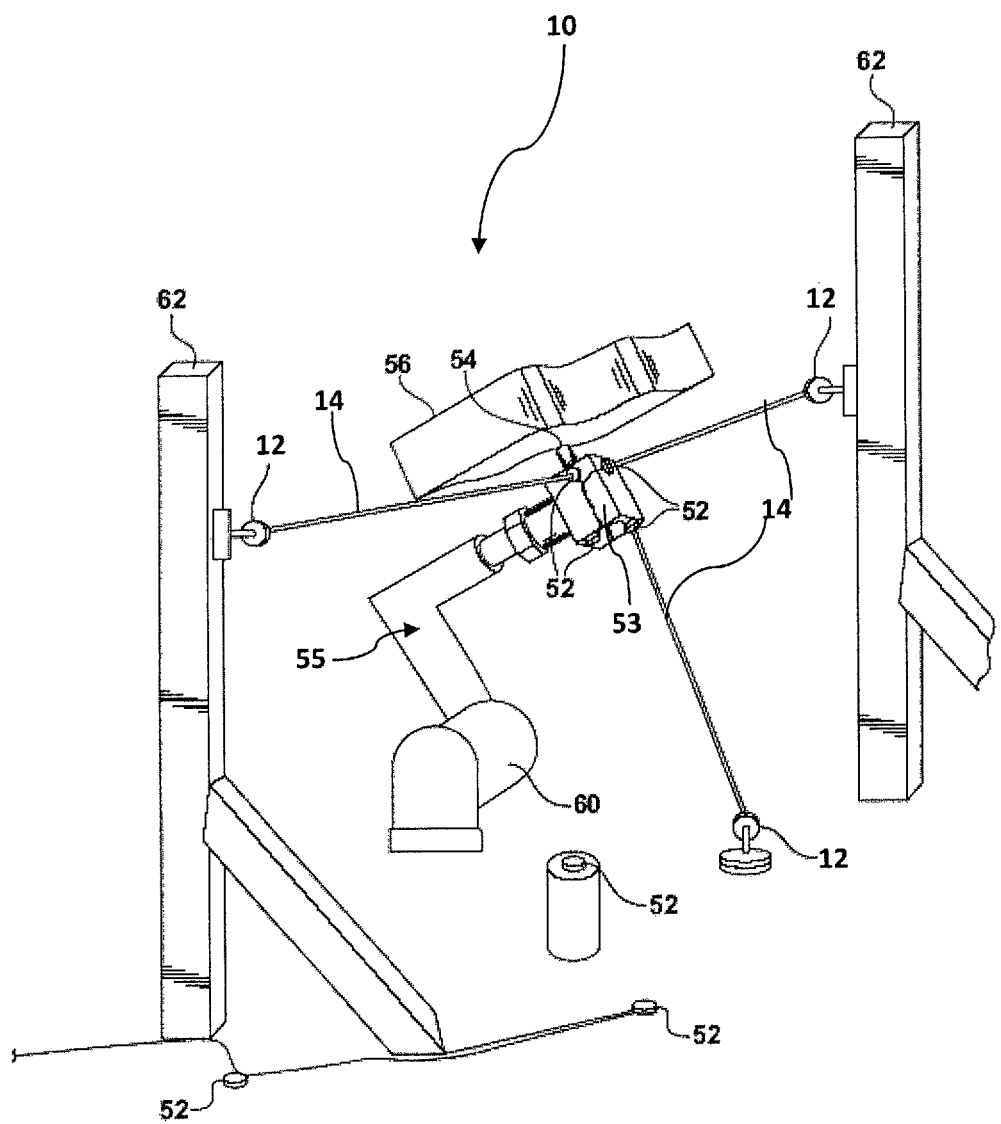
FIG. 6 illustrates an environmental view of an external system for robotic accuracy enhancement of the present invention.

Referring to the Figures, wherein numerals indicate like or corresponding parts, an inventive system and method for robotic and equipment accuracy enhancement is generally shown at 10 in FIG. 6. The system 10 includes a plurality of multi-axial devices, generally shown at 12 in FIGS. 1 and 2. These multi-axial devices 12, i.e. beacons, are capable of steering a light beam 14, such as a laser, LED, or incoherent source without limiting the scope of the present invention. Typically, the multi-axial device would be a gimbal as shown in FIG. 1, which illustrates a front view of the multi-axial device 12 and FIG. 2, which illustrates a side view of the multi-axial device 12. Those skilled in the art will appreciate that other devices for generating and steering light beams may be used with the present invention without limiting the scope of the present invention. The beacon 12 presents a certain mechanical pointing resolution (the ability to physically point the beam to a commanded position) along with a mechanical pointing determination (the ability to determine the vector of the laser beam 14 possibly via calibrated encoders for the azimuth and elevation angles). The beacon 12 would steer a laser source (solid state diode, fiber-coupled, or other) contained in a housing 20, producing a collimated or semi-collimated output beam 14. It is also quite possible that the laser output could be in a pattern other than that of a traditional beam, such as a line or crosshairs. If the laser exit aperture 22 defined in the housing 20 is not perfectly coincident with the intersection of the azimuthal axis 26 and the elevational axes 24, then the beacon 12 would need to be modeled/calibrated to determine the (x,y,z) position of the laser exit aperture at any given pointing direction. The beacon 12 could be attached to a mounting base 28 of the beacon 12 and so be easily incorporated into a manufacturing environment. Services, such as power and communication cables or air lines 30, would run from the work cell controller out to each beacon 12. In this example, FIG. 2 shows that the laser exit aperture 22 is nearly coincident with the center of rotation of the gimbal (center-mounted in the housing).

The system 10 proposed herein would have software that would control a plurality of the beacons 12. Again, the beacon manufacturer may retain access and control of the beacon's internal calibration/modeling. However, the software described in the present application would need to be able to point the beacon 12 (possibly with real-time feedback), turn the laser on/off, and receive the laser beam's 14 (i,j,k) vector (or elevation, azimuth angles) in its native coordinate frame along with possibly the (x,y,z) of the laser exit aperture 22, again in the beacon's 12 native coordinate frame (see above). The proposed metrology system 10 will employ novel target elements, i.e. active targets generally shown at 16 in FIGS. 3 and 4.

As shown in FIG. 3, the target element 16 includes a base defined by a plate 44 defining three or more attachment points or openings 40. The base may include other configurations, and is not limited to the plate. The plate 44 could be fabricated from metal or another machinable, preferably low CTE material. The attachment points 40 receive calibration targets 36 supported on calibration target nests 38. In this example, the attachment points 40 are dowel holes, and the target nests 38 are doweled, magnetic cups, the type that are typically used to hold theodolite target spheres, spherically mounted passive photogrammetry targets, spherically mounted active photogrammetry targets, or spherically mounted retroreflectors (SMRs) used with laser trackers. Mounted to the plate 44 is a photosensitive array 34, which could be a CMOS array, CCD array, or line scan sensor and the like. Services 42 for the array could include power and communication cables.

FIG. 4 shows the target element 16 enclosed or encapsulated in a protective housing 46. This housing 46 may employ a shutter 48 that could be pneumatic or electric. Services 50 would run to the shutter 48, with the option to use an additional air line to periodically blow dust from the target element 16 or to create positive air pressure within the puck enclosure itself, thus acting as a dust barrier. As the target element 16 may be mounted to motion devices, i.e. a robotic device or in the work cell itself, they will probably include dowels or other features that would serve for generic/standardized mounting.

Figure 5:
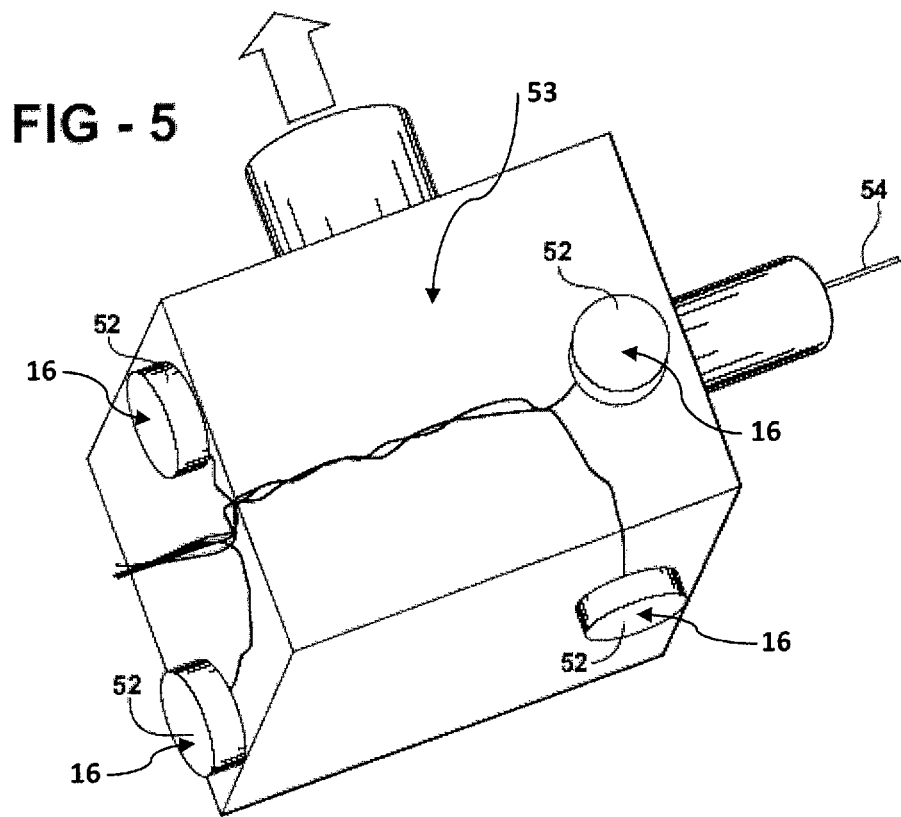
FIG. 5 illustrates a perspective view of an end of arm tool of a robotic device having a plurality of active targets connected thereto.

FIG. 5 demonstrates the target elements, generally indicated at 16 being deployed on an end of arm tool, i.e. EOAT, generally indicated at 53 in FIG. 5, of the robotic device, generally indicated at 55 in FIG. 6. As will be discussed later on, it is desirable to mount (and have LOS to) at least 3 of the target elements 16 at mutually orthogonal orientations onto the EOAT 53 and relative to a central axis 54 of the EOAT 53. During the work cell tooling certification phase, each target element 16 is defined in the tool coordinate frame (the EOAT frame), relative to the tool center point, i.e. the aforementioned central axis 54. The central axis 54 is defined as the origin of the tool frame. The target element services would be dressed along the robotic device 55 out to the EOAT 53.

FIG. 6 demonstrates how the proposed system could be deployed in a manufacturing environment. The encapsulated target elements 52 would be mounted to the EOAT 53, along with additional target elements 52 mounted to the floor, station tooling, or, for example, carbon fiber or concrete posts 62. The beacons 12 would also be distributed throughout the work cell. Their numbers and positions would most likely be optimized based on a computer simulation of the robotic device 55 as it performs the intended process. Since the beacons 12 will usually be able to guide the robotic device 55 quicker than the device 55 can perform its work, the system 10 allows most of the beacons 12 to perform duplicate guidance duty for other robotic devices 55 in the work cell, thus lowering overall system hardware cost. For instance, if it takes ten seconds for the robotic device 55 to drill a hole in a workpiece 56, but only three seconds to guide that robotic device 55 to the correct work position, these beacons 12 could spend the other seven seconds guiding other robotic devices 55 in the work cell. In this example, the tool TCP 54, also aligned with a drill tip, would be guided to the correct work pose, i.e. location and orientation, before being permitted to drill the workpiece 56. Alluding to the above, the target elements 16 may be affixed to control points on the workpiece 56. In this way, the part-to-world relationship may be determined for each part entering the work cell.

Figure 7:
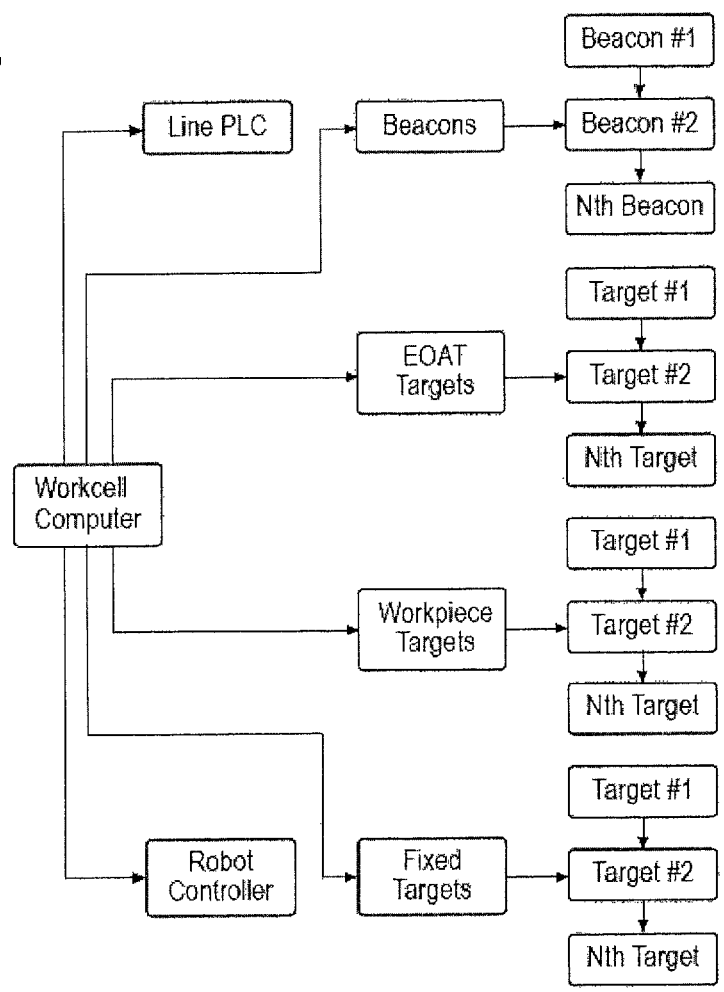
FIG. 7 illustrates a schematic view of work components of the external system for robotic accuracy enhancement in a typical manufacturing environment.

FIG. 7 demonstrates the interconnectivity of the deployed system 10 in a typical manufacturing environment. A computer will control multiple beacons and EOAT target elements, with possibly some additional target elements mounted to the workpiece 56, or distributed inside the work cell. The station computer can communicate to one or more line/station PLC (Programmable Logic Controller) and at least one robot controller. It may be possible that each target element could have an on-board computer chip to perform image processing, but this upgrade may not always be warranted if cost factors outweigh the need for decreased cycle time. It is intended, though not required, that the software running the system 10 would be a 'slave' to the robotic device 55, measuring only when the robotic device 55 so requests.

Figure 9:
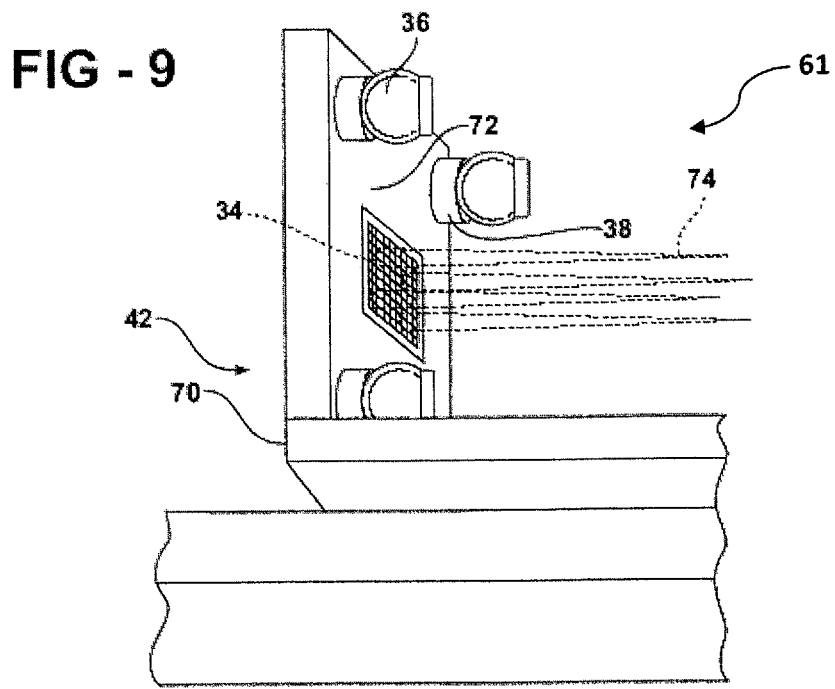
FIG. 9 illustrates a partial and side view of the device for calibrating the active target of FIG. 8.
Figure 8:
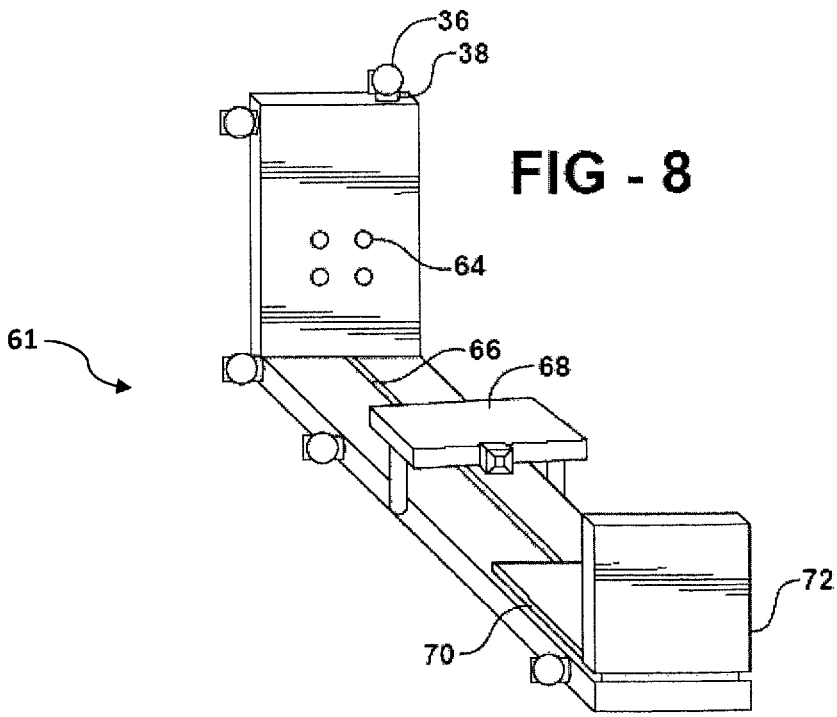
FIG. 8 illustrates a perspective view of a device for calibrating the active target of the present invention.

FIGS. 8 and 9 present a novel method of how newly-manufactured target elements 16 are calibrated. The idea is to relate the coordinate system of the photosensitive array (pixel space) to the positions of the removable, nested 38 metrology targets 36 in a 'target coordinate system', and save the results in a calibration file linked to the unique ID of the target elements 16. The target coordinate system will be derived from a calibration stand shown at 61 in FIGS. 8 and 9. Additional standardized mounting features may be included to the target elements 16 (such as three dowels protruding from the back of the plate 44) and defined in the 'target coordinate system' at this point in time also. To ensure dimensional integrity, the calibration stand 61 may reside in a climate controlled enclosure (not shown). The calibration process is described in FIG. 10.

All the following part numbers refer to those in FIGS. 8 and 9. An external metrology system, such as theodolites, laser tracker, or a photogrammetric system, is set up about the calibration stand 61. The metrology targets 36, appropriate to the external metrology system, are positioned into the doweled target nests 38, which subsequently would be placed in (for example) dowel holes 40 on the calibration stand 41. The first time the calibration stand 61 is certified, the (x,y,z) coordinates of each target location of the calibration stand 61 is recorded in the 'target coordinate system'. By measuring at least three of these target positions, the metrology device can report in the calibration stand coordinates.

Alluding to the above, the target element plate 72 is affixed to a slide unit 70 and powered up via the service cables 42. The operator (not shown) installs at least three nested targets 36, 38 in the dowel holes 40 of the target plate. The operator positions a stop device 68 onto two posts affixed to the calibration stand 61. The operator then gently moves the slide unit 70 forward along rails 66 until the stop device 68 contacts the cover glass of the photosensitive array 34. At this point, the slide unit 70 is locked into place, and the operator removes the stop device 68. It may be desirable for the stop device 68 to contact the inactive area surrounding the photosensitive array 34, and all this would require is determining and possibly controlling the manufactured distance between this surface and the array's surface. Let the manufactured thickness of the array cover glass be D.

The first time the calibration stand 61 is certified, the array cover glass-contacting surface of the stop device 68 may be defined as being at (for example) 'target coordinate system' z=D. If the 'z' axis of target coordinates runs negative as one goes toward the active target, this would imply that the photosensitive array surface is at the z=0 plane. The axes shown in FIG. 8 present a possible target coordinate system orientation, with the origin maybe located somewhere near the center of the photosensitive array. Another aspect of the calibration stand 61 is the laser output apertures 64. These apertures 64 would produce laser beams focused to the approximate position of the photosensitive array, at z=0. Here the beams are shown as circular in cross-section, though if the photosensitive element of the target elements 12 would happen to be a linear array or arrays, the laser output may very well be a set of one or more crossed lines.

During the initial certification of the calibration stand 61, theodolites could easily be used to measure the (x,y) position each of the focused laser beams at the z=D (cover glass) plane. Thus, when one projects the focused laser beams 74 onto the array 34, each of the (for example) four laser spot centers is already known in target coordinate space. By processing the centers of at least three laser spots in pixel space, enough information is known to calculate the pixel space-to-calibration stand transformation matrix. Here, calibration stand coordinates and target coordinates are used synonymously. This entire active target calibration procedure could be obviated by precision machining the target element 16. In this case, the alignment and position of the photosensitive array relative to the rest of the target element 16 would have to be extremely accurate.

The obvious down side of this approach is a greatly increased target element 16 manufacturing cost. However, each target element 16 would allegedly be identical to the others, so a single, CAD-determined pixel space-to-target coordinate transform could be used. In the case where every aspect of the target element 16 is precision machined except for the placement/alignment of the photosensitive array, one could eliminate the need to have an external metrology device measure the positions of the nested targets. For manufacturers that lacked an external metrology device such as a laser tracker (~$100,000.00), the added cost of purchasing or renting (~$1000.00/day) such a metrology device may be larger than the extra cost of precision machining almost all dimensions of the target element 16.

In summary, the laboratory calibration of the target element 16 defines the relationship between pixel space of the photosensitive array and the positions of external metrology targets that can be temporarily affixed to the active target plate. Additional features on the target element 16, such as mounting dowels, may also be defined in the target coordinate space during calibration. Each target element 16 will most likely possess a unique ID, and the active target calibration file will be linked to this identifier. This process is mapped out in FIG. 10.

During the work cell certification phase on the manufacturing floor, the calibration file allows for the pixel space of target element 16 to be defined relative to another coordinate frame (such as World, Part, or Tool). This is achieved by setting up an external metrology system in the desired coordinate frame, and then measuring at least 3 target positions on the target element 16. A best-fit of 3 or more data pairs (active target coordinates from the calibration file, external coordinate frame coordinates from external metrology device) generates the active target-to-external coordinate frame matrix.

Figure 11:
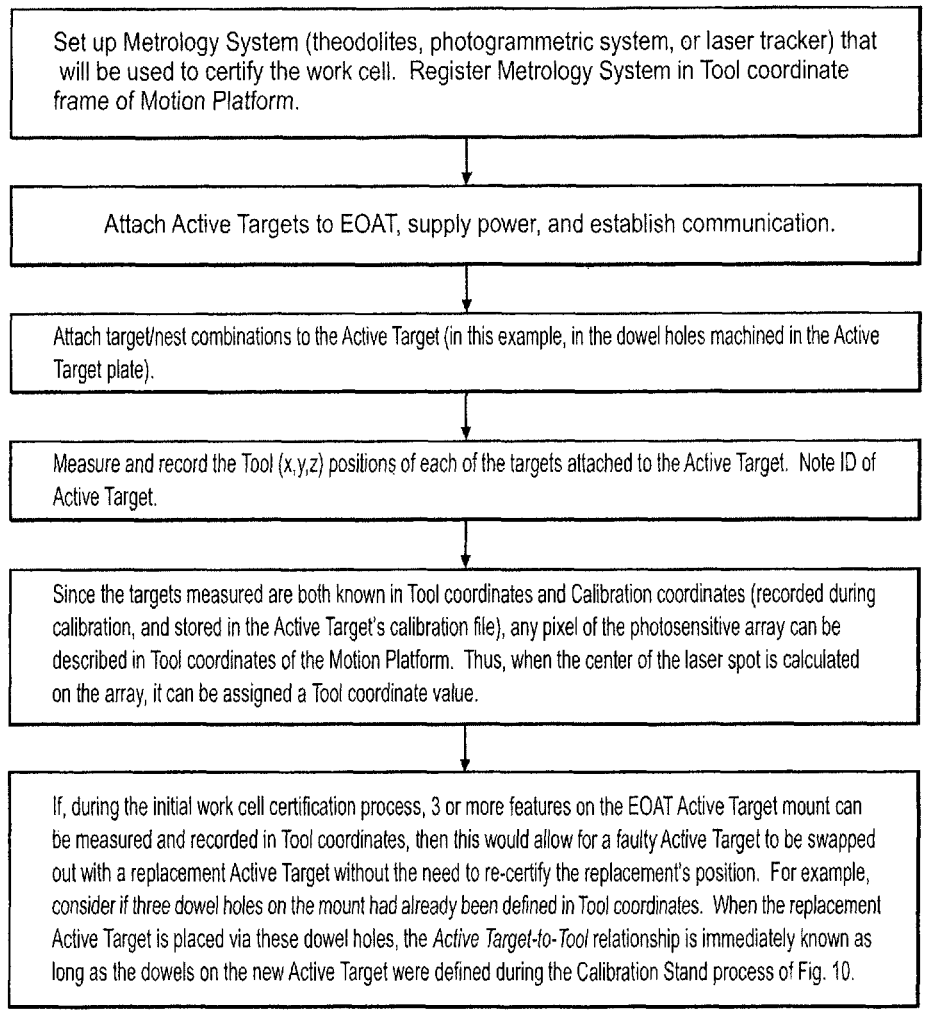
FIG. 11 is a schematic view of a method of certifying the active targets on the end of arm tool of the robotic device.

FIG. 11 summarizes a novel method of how an active target mounted to the robotic device 55 can be defined relative to said tool's coordinate frame. The target element 16 already possesses a pre-defined coordinate frame via the calibration process described in FIG. 10. By employing an external metrology system reporting in the EOAT coordinate frame, appropriate targets can be nested into the dowels of the plate 44, and their positions can be recorded in EOAT coordinates. If this is done for at least three of these targets, the active target-to-EOAT relationship can be calculated via a best-fit between the tool coordinate values and the pre-defined target coordinate values stored in the calibration file. If, before inserting the target element 16 into (for instance) three dowel holes on the EOAT, the tool coordinates of these three dowel holes can be measured and recorded via the external metrology system, then this allows for the ability to swap out a defective target element 16 with a replacement target element 16 on the EOAT without requiring further certification (and the use of an external metrology system) to determine the active target-to-EOAT relationship. This can be accomplished by requiring that (for instance) the three dowels on the back of the plate 44 be recorded in active target coordinate space during the laboratory certification process. When swapping out target element 16, the new active target-to-EOAT transform can be computed by best-fitting the calibrated dowel positions in target space to the dowel hole positions on the EOAT in tool space.

Figure 12:
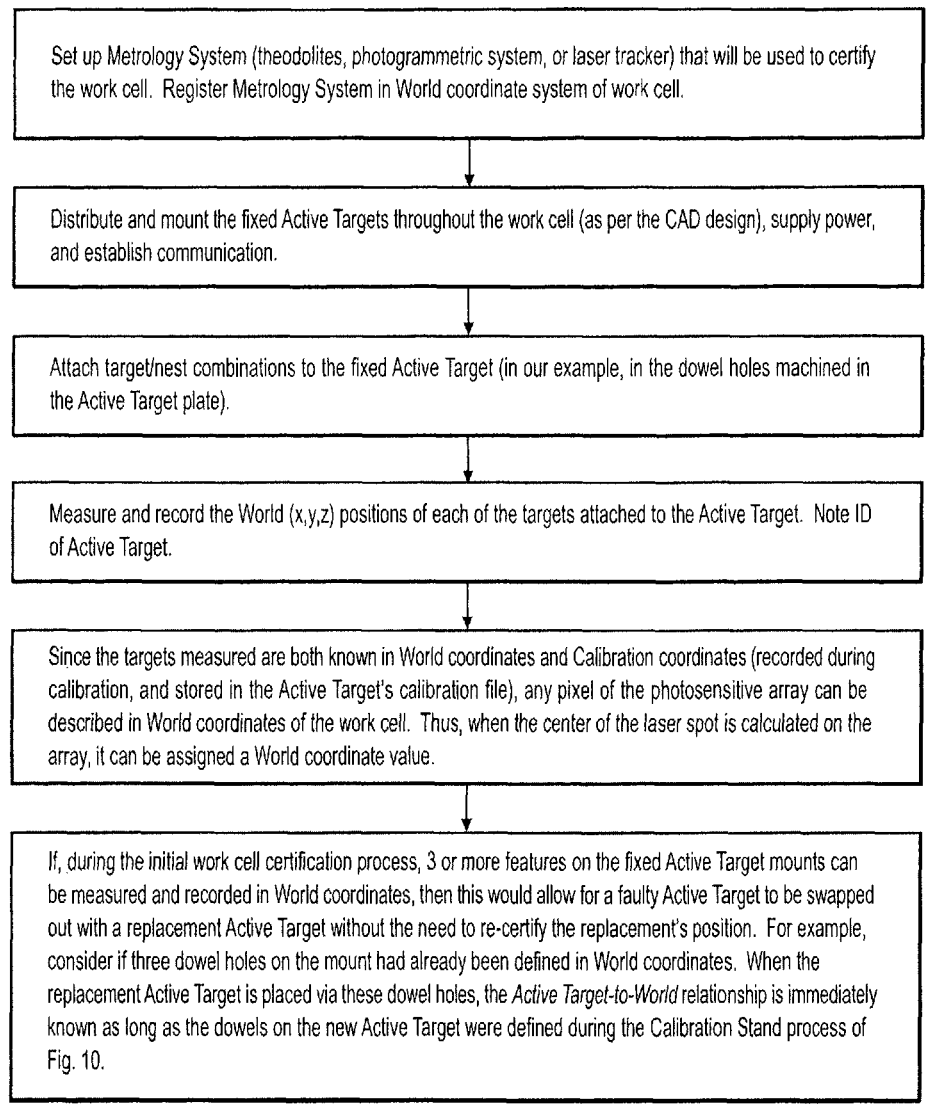
FIG. 12 is a schematic view of a method of certifying the active targets in the work cell of the manufacturing facility.

FIG. 12 summarizes a novel method of how the target element 16 is mounted in the work cell and can be defined relative to said work cell's world coordinate frame. The target element 16 already possesses a pre-defined coordinate frame via the calibration process described in FIG. 10. By employing an external metrology system reporting in the world coordinate frame, appropriate targets can be nested into the dowels of the active target plate, and their positions can be recorded in world coordinates. If this is done for at least 3 of these targets, the active target-to-world relationship can be calculated via a best-fit between the world coordinate values and the pre-defined target coordinate values stored in the calibration file. If, before inserting the active target into (for instance) 3 dowel holes on a fixed mount, the world coordinates of these 3 dowel holes can be measured and recorded via the external metrology system, then this allows for the ability to swap out a defective target element 16 with a replacement target element 16 on the fixed mount without requiring further certification (and the use of an external metrology system) to determine the active target-to-world relationship. This can be accomplished by requiring that (for instance) the three dowels on the back of the plate 44 be recorded in active target coordinate space during the laboratory certification process. When swapping out the target element 16, the new active target-to-world transform can be computed by best-fitting the calibrated dowel positions in target space to the dowel hole positions on the fixed mount in world space.

FIG. 13 summarizes a novel method of how the target element 16 mounted to a control point on the part can be defined relative to both the work cell's world coordinate frame as well as to the part coordinate frame. Here, 'control point' refers to a location on the part that is accurately described/machined in part coordinates; 'control points' usually serve as master alignment references for at least some portions of the production/assembly process. By employing an external metrology system reporting in the world coordinate frame, each of the part control points can be assigned world coordinates. If at least 3 control points are measured in this way, the part-to-world transform can be calculated via best-fit since each control point has an assigned part coordinate value. The target element 16 already possesses a pre-defined coordinate frame via the calibration process described in FIG. 10.

Using the external metrology system reporting in the world coordinate frame, appropriate targets can be nested into the dowels of the active target plate, and their positions can be recorded in world coordinates. Since the part-to-world transform is already known, these same points can also be assigned part coordinates. If this is done for at least 3 of these targets, both the active target-to-world and active target-to-part relationships can be calculated via a best-fit between the world/part coordinate values and the pre-defined target coordinate values stored in the calibration file. It is not really necessary to determine the part-to-world transform in order to define the active target-to-part relationship. However, it is wise to measure the part-to-world transform at this stage in order to check this against the part-to-world relationship used in the offline computer simulation of the production process; essentially, you are validating the as-built positioning of the part in the work cell versus the design intent. In order to be able to use a new active target in a control point on the part without having to re-establish the active target-to-part relationship via an external metrology system, one would have to define the dowels on the active target plate 44 in target coordinates during the laboratory calibration of the new target. This process has already been explained for the EOAT active targets and fixed-mounted active targets, and does not differ here in any way. Now that the active target-to-part relationships are known for each control point on the part, this information can be used to determine the as-positioned part pose in world coordinates, so long as the three LOS from the beacons to the active targets on the part are not mutually parallel.

FIG. 14 summarizes a novel method of how the beacon 12 mounted in the work cell can be defined relative to the work cell's world coordinate frame. The beacon 12 is commanded to point the laser beam in a desired orientation. The target element 16, perhaps mounted to a tripod that can be moved about the work cell, is positioned such that the beacon's laser beam hits the photosensitive array of the target element 16. The target element 16 already possesses a pre-defined coordinate frame via the calibration process described in FIG. 10. By employing an external metrology system reporting in the world coordinate frame, appropriate targets can be nested into the dowels of the active target plate 44, and their positions can be recorded in world coordinates. If this is done for at least three of these targets, the active target-to-world relationship can be calculated via a best-fit between the world coordinate values and the pre-defined target coordinate values stored in the calibration file. The computer solves for the center of the laser spot on the photosensitive array and reports this point in world coordinates. The beacon 12 also reports the vector of the laser beam in beacon coordinates along with the (x,y,z) value of the laser exit aperture in beacon coordinates.

The process is then repeated for at least two other beacon poses. For best results, the second and third poses of the beacon should create a mutually orthogonal set with the first position. We now have three distinct lines defined in the beacon coordinate frame (three laser exit aperture (x,y,z) start positions along with three vectors) that must intersect three points in world coordinates. This is enough information to solve the beacon-to-world transform. However, if the beacon's accuracy is limited (native ability to determine its pointing vector or the laser exit aperture position), one may very well wish to include more than 3 position/pose measurements when calculating the beacon-to-world transform. Once the beacon-to-world transform is known, the beacon will be able to direct the laser beam at any commanded world coordinate point. Likewise, if the part-to-world transform is also known, the beacon will also be able to point to any commanded part coordinate.

FIGS. 15 and 16 summarize a novel method of determining the 6-DOF pose of a motion device's EOAT by projecting laser beams onto at least 3 EOAT-mounted active targets. FIG. 11 describes the process by which EOAT-mounted active targets are defined relative to the EOAT coordinate frame. Thus, whenever a beacon points a laser beam onto the photosensitive array of the target element 16, the center of the laser spot can be assigned a tool coordinate value. Via the beacon-to-world transform, the laser beam can be described as a line in the world coordinate frame. So, for a particular target element 16, we know that the tool coordinate value must exist somewhere along this 'world line'.

When this information is known for 3 or more active targets, the 6-DOF pose of the EOAT can be calculated, provided at least 3 of the 'world lines' are not parallel to each other. For cases where only 3 'world lines' are used, the optimum situation would have all 3 being mutually orthogonal, with one of the active targets positioned as closely as possible to the TCP of the EOAT while maintaining a sufficient spacing between all the active targets in order to minimize 'lever arm' effects on the calculated position of the TCP. While this perfect situation cannot always be achieved, extra accuracy can be gained by using more than 3 lines of sight. This could be achieved by employing more than 3 beacon/active target pairs, or for situations where the robot is stationary, by having some of the beacons measure more than one active target.

Figure 17:
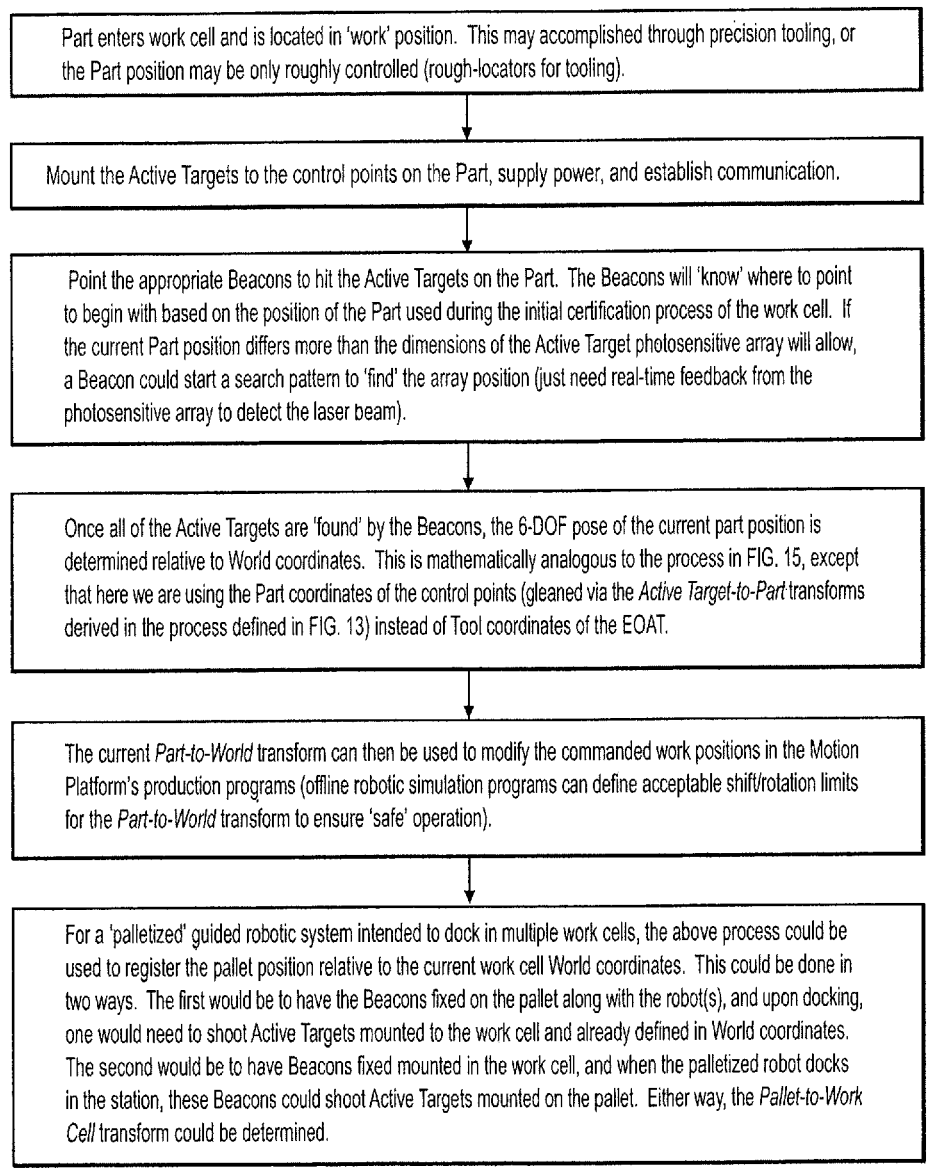

FIG. 17 summarizes a novel method of determining the 6-DOF pose of a part relative to the work cell world frame by projecting laser beams onto at least 3 part-mounted active targets. FIG. 13 describes the process by which part-mounted active targets are initially defined relative to the part coordinate frame. Thus, whenever a beacon points a laser beam onto the photosensitive array of a part-mounted active target, the center of the laser spot can be assigned a part coordinate value. Via the beacon-to-world transform, the laser beam can be described as a line in the world coordinate frame. So, for a particular active target, we know that the part coordinate value must exist somewhere along this 'world line'. When this information is known for 3 or more active targets, the 6-DOF pose of the part in world frame can be calculated, provided at least 3 of the 'world lines' are not parallel to each other. The optimum situation would be 3 mutually orthogonal 'world lines' striking active targets that are attached to the part. While this perfect situation would rarely be achieved, extra accuracy could be gained by using more than 3 lines of sight. Knowing the part-to-world transform allows the paths or work positions of the motion device or devices (stored in the kinematic programs) to be modified, provided the current part position does not differ too much from the 'nominal' (design) part position.

This nominal part position may have been used during the initial off-line robotic simulation of one or more motion device's programmed work paths or work positions. Thus, it is possible to define 'safe' rotates and shifts for the current part pose via off-line motion path simulation. Of course, defining 'safe' part poses could also be done without the aid of off-line programming simulations, where the (current part position) adjusted motion device poses could be compared to those stored for each work position in the kinematic program or programs of one or more motion device. The last step in FIG. 17 describes how this same methodology could be applied to a 'palletized' guided robotic system.

FIG. 18 summarizes a novel method of accounting for 'drift' of the proposed metrology system inside a work cell. Drift could occur due to temperature changes in the manufacturing environment (consider a beacon mounted high upon a steel structure, or an aerospace wing drilling process that takes 16 hours to complete). In this way, the beacon-to-world or beacon-to-part transforms can be periodically updated. 3 other situations are mentioned in FIG. 18 that can be corrected for in the same manner as temperature drift—namely, swapping out a faulty beacon, monitoring pallet-to-work cell drift for a palletized guided robotic system, or re-acquiring the beacon-to-world relationship for a moveable beacon. In any of these cases, the beacon would update its beacon-to-world (or beacon-to-part) transform by measuring at least three fixed-mounted (in the work cell, on a pallet, or on a part) active targets. This process is completely analogous to that of FIG. 14, with the exception that the active targets are not being temporarily moved around the cell during an initial calibration process.

Figure 19:
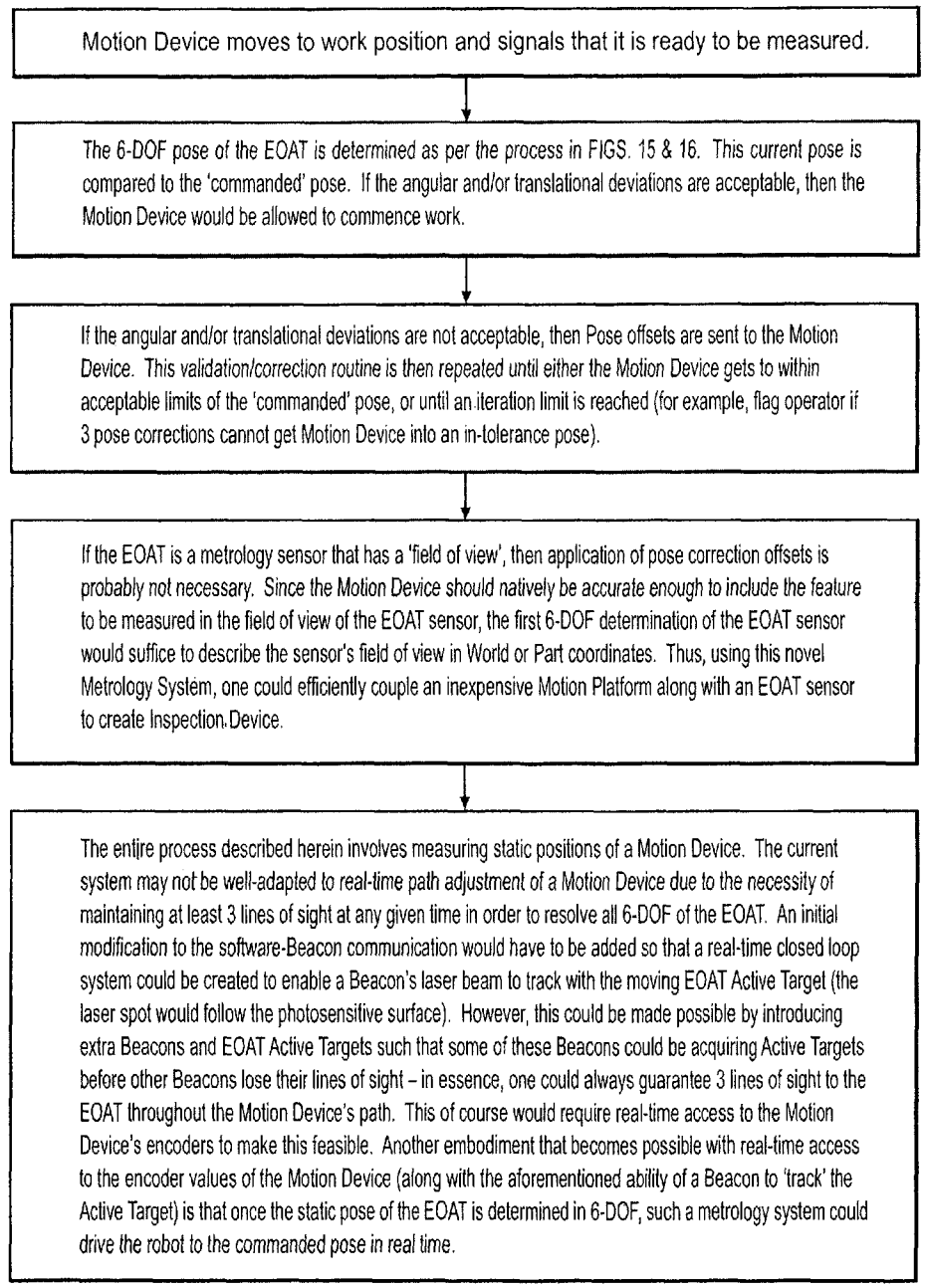

FIG. 19 describes the method of correcting a motion device's pose using the novel metrology system. It is fairly straightforward and does not warrant further discussion here. A description for combining a motion device, a non-contact metrology sensor as the tool, and the novel metrology system to create an affordable inspection device is also included. This is a slightly different take on the main usage of the system, since one needs only to define the pose of the metrology sensor at a work position, providing the 'field of view' of said sensor is more accommodating than the native inaccuracy of the motion device (i.e., the non-contact sensor can still see its intended 'target', since it possesses a large enough 'field of view' to overcome the pose inaccuracy of the motion device). Up to this point, all the descriptions have assumed static pose correction of a motion device. The last text box of FIG. 19 explains what modifications may be needed in order to enable the proposed metrology system to function as a path correction system.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of determining robotic accuracy enhancement for a plurality of robotic devices performing operations of parts, said method comprising the steps of;
    positioning at least one robotic device having an end of arm tool (the EOAT) relative to at least one part with the EOAT adaptable for multiaxial movement relative to the robotic device and the at least one part;
    positioning a calibration stand with a plurality of laser emitting devices and a plurality of active target plates being clamped and powered on the calibration stand and install a stop device onto the calibration stand;
    move the plurality of the active target plates positioned on a slide device until the stop device contacts a photosensitive array of the active target thereby locking position of the slide device;
    connecting a controller to the active target plates, the calibration stand, and the at least one robotic device;
    installing a metrology system relative the at least one robotic device and the at least one part wherein the metrology system includes at least one of theodolites, photometric system, and laser tracking device to measure at least three benchmark positions of the calibration stand to report to the controller coordinate data of the calibration stand;
    powering the laser devices on the calibration stand wherein the initial certification of the calibration stand through X and Y position of each laser beams emitting from the laser devices is predetermined in order to determine values of X and Y positions of each laser spot on a photosensitive array;
    determining an array-to-calibration stand matrix relationship by processing an image from the photosensitive array from the center of each laser spots in pixel space of at least three points; and
    measuring calibration stand coordinates through measurement of active targets placed on each dowel hole defined in the active target plates whereby three dimensional values are stored in the controller with the array-to-calibration stand matrix.

2. A method as set forth in claim 1, including the step of distributing the active target plates with the active targets around a cell where the calibration stand, the at least one robotic device, and the part are located to establish communication between the active target plates.

3. A method as set forth in claim 1, including the step of measuring and recording a world position of each of the active targets attached to the active target plates in a world coordinates system to generate identification code for each of the active targets.

4. A method as set forth in claim 1, including the step of assigning positioning the active targets of the part and transforming the laser spot coordinated to the world position as the center of the laser spot is calculated since the active target positions are measured and known in the world coordinates system.

5. A method as set forth in claim 1, including the steps of measuring at least three control points on the part in the world coordinates system to determine a part-to-world location.

6. A method as set forth in claim 1, including the step of determining the pose of the photosensitive array in the world coordination system and determining correlation between position of the active targets located around the cell, placed on the part and located on the at least one robotic device.

7. A method as set forth in claim 1, including the step of registering the metrology system in the world coordinates system.

8. A method as set forth in claim 1, including the step of placing a beacon in the work cell and certifying the beacon in the world coordinates system.

9. A system for robotic accuracy enhancement (the system) comprising:
- a plurality of robotic devices adaptable for multi-axial movement with each of, said robotic devices including an arm having an end of arm tool (EOAT) presenting at least one axis for performing at least one operation on a workpiece;
- a plurality of multi-axial devices projecting laser beams oriented relative to said robotic device;
- a plurality of removable target elements connected to the EOAT of each said robotic device with each of said target elements being pre-certified in the EOAT coordinate frame, allowing said robotic devices to orient the EOAT relative to the workpiece before performing an operation on the workpiece as each of said target elements are illuminated by said multi-axial devices;
- a controller is operably communicated with said target elements, said plurality of multi-axial devices, and said plurality of robotic devices for manipulating at least one of said multi-axial device to activate at least one target element to determine the 6-DOF (Degree of Freedom) pose of said robotic devices wherein said multi-axial devices for projecting lasers connected to the removable target element positioned on the EOAT adaptable to determine the pose of the EOAT at distinct work positions of at least one motion device without the use of any range detection hardware; and
- wherein pre-certifying each of said target elements in the EOAT coordinates frame includes setting UP an external metrology system in the EOAT coordinate frame, measuring at least three target positions on the target element, and generates an active target-to-EOAT coordinate frame matrix based on a calibration file of the target element.

10. A system as set forth in claim 9, wherein each target element comprises a base formed from at least one of metallic and non-metallic materials and presents a plurality of openings defined therein.

11. A system as set forth in claim 9, wherein said base presents a plurality of removable nest elements attachable to the respective openings defined in said and a plurality of calibration targets magnetically supported by the respective nest elements.

12. A system as set forth in claim 9, wherein said base further includes a photosensitive array defined in the plate.

* * * * *